US012644759B2

(12) United States Patent
Ma et al.

(10) Patent No.: US 12,644,759 B2
(45) Date of Patent: Jun. 2, 2026

(54) WIRELESS PASSIVE MECHANICAL VIBRATION MONITOR SYSTEM

(71) Applicant: Wisconsin Alumni Research Foundation, Madison, WI (US)

(72) Inventors: Chu Ma, Middleton, WI (US); Dajun Zhang, Madison, WI (US); Bhuvana Krishnaswamy, Madison, WI (US); Muhammad Osama Shahid, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 315 days.

(21) Appl. No.: 18/436,751

(22) Filed: Feb. 8, 2024

(65) Prior Publication Data

US 2025/0258033 A1     Aug. 14, 2025

(51) Int. Cl.
*G01H 9/00* (2006.01)
(52) U.S. Cl.
CPC ..................................... *G01H 9/00* (2013.01)
(58) Field of Classification Search
CPC ...................................................... G01H 9/00
See application file for complete search history.

(56) References Cited

U.S. PATENT DOCUMENTS 5,886,264 A * 3/1999 Hu .......................... G01H 3/125
356/28
2023/0047060 A1* 2/2023 Seurin ................... G01L 9/0077

FOREIGN PATENT DOCUMENTS

CN        106501182 B * 6/2019 ......... G01N 21/1702

OTHER PUBLICATIONS

Cong Gao et al.; "Study of vibration absorption characteristics of membrane-type resonators with varying membrane configurations." In INTER-NOISE and NOISE-CON Congress and Conference Proceedings, vol. 258, No. 4, pp. 3686-3695. Institute of Noise Control Engineering, 2018; CN.

* cited by examiner

*Primary Examiner* — Thomas M Hammond, III
(74) *Attorney, Agent, or Firm* — Boyle Fredrickson, S.C.

(57)        ABSTRACT

A passive vibration sender boosts the amplitude of vibrations of interest on a reflector when the sender is attached to a vibrating surface. This amplitude boost together with a band limiting of the vibration signal allows improved remote detection through perturbations of electromagnetic waves reflected by a reflector of the sender.

17 Claims, 3 Drawing Sheets

WIRELESS PASSIVE MECHANICAL VIBRATION MONITOR SYSTEM

STATEMENT REGARDING FEDERALLY SPONSORED RESEARCH OR DEVELOPMENT

This invention was made with government support under 1720415 awarded by the National Science Foundation. The government has certain rights in the invention.

CROSS REFERENCE TO RELATED APPLICATION

Background of the Invention

The present invention relates generally to vibration sensors and in particular to a vibration sensor employing a passive wireless sender operating to boost and filter a sensed vibration signal.

Real-time vibration sensing is important in a variety of applications in industry, health care, and environmental monitoring. For example, vibration monitoring can assist in the prediction of natural disasters such as typhoons, earthquakes, and avalanche calamities, and for meteorological observations and geological surveys. Vibrations induced by human breathing and heartbeat are important vital signals for health monitoring. Vibration monitoring can also provide in-situ and non-destructive tools for diagnosing the structural health of vehicles, industrial equipment, buildings, and public infrastructures.

Contact-based vibration sensing typically uses an electronic sensor attached to the vibrating surface to provide accurate frequency and displacement measurements, for example, using strain type, piezoelectric, or electromechanical sensors. The cost of such sensors, including their supporting electronics can be prohibitively high especially if multiple monitoring locations are required. In many sensor applications providing electrical power to the sensor location or by batteries can be impractical.

For this reason, there is substantial interest in non-contact vibration sensing, that can monitor multiple locations or that avoids the need for a local source of power. Such non-contact vibration sensing systems, for example, may be based on video imaging of a vibrating surface or the measurement of Doppler shift in radio waves reflected from that surface. Low sensitivity is a key limitation to many non-contact sensing systems. Camera systems require extremely high resolution to resolve low amplitude vibration information and the long wavelength of radio signals (e.g., about 30 cm for RFID frequencies and 6 to 12 cm for Wi-Fi frequencies) result in nearly undetectable Doppler phase shifts in important ranges of lower vibration frequency.

SUMMARY OF THE INVENTION

The present invention provides a passive vibration sender boosting the amplitude of the vibration and thus the ability of remote sensing systems employing cameras or changes in a radiofrequency field to detect the vibration. The passive design potentially provides a much lower cost than active electronic sensors and eliminates the need for a source of power either locally or through external power connections. Generally, the sender provides a reflector associated with or part of a mass spring system having an eigenfrequency in a vibration frequency of interest. The sender boosts the amplitude of vibration at the reflector in a frequency of interest while reducing vibration at other frequencies, thereby increasing the signal-to-noise ratio in the remote sensing signal.

More specifically, in one embodiment, the invention provides a system for remotely detecting vibration of a vibrating object and including: a source of radiated electromagnetic energy, a reflector adapted to reflect a portion of the radiated electromagnetic energy, and a mount adapt to physically couple the reflector to the vibrating object to promote vibration of the reflector. A receiver is also provided sensing the reflected radiated electromagnetic energy for measurement of the vibration of the reflector. Importantly, the reflector provides a coupled mass and elastic biasing producing a predetermined reflector eigenfrequency that boosts predetermined vibration frequency of the vibrating object for detection by the receiver.

It is thus a feature of at least one embodiment of the invention to greatly improve remote-sensing sensitivity using a low-cost passive vibration sender.

The source of radiated electromagnetic energy can be either an optical or radiofrequency transmitter and the receiver can be either an optical sensor or radio receiver. For these purposes, the reflector may be either an optical reflector and/or a radiofrequency reflector having a reflector dimension at least one tenth the wavelength of the electromagnetic energy.

It is thus a feature of at least one object of the embodiment of the invention to provide a reflector that can be readily detected by optical or radiofrequency remote sensors.

In one embodiment, the reflector may employ an elastic membrane held within a frame providing a vibrational boundary at the eigenfrequency.

It is thus a feature of at least one embodiment of the invention to provide an extremely low-cost reflector system for use on a vibration sensor integrating the reflector and spring element.

The elastic membrane may include at least one attached weight whose mass lowers the eigenfrequency or may provide for multiple attached weights associated with distinct eigenfrequencies.

It is thus a feature of at least one embodiment of the invention to permit multiple eigenfrequencies for sending frequency information in different frequency bands.

In this case, the receiver may provide an identification table identifying the reflector among multiple reflectors according to one of at least two distinct eigenfrequencies.

It is thus a feature of at least one embodiment of the invention to allow the deployment of multiple senders and to distinguish between the senders from vibrational energy channeled into unique eigenfrequencies.

In some embodiments, the reflector may be a metallized polymer.

It is thus a feature of at least one embodiment of the invention to boost the radio reflectivity of the membrane using a thin coating with minimal effect on the eigenfrequency.

The eigenfrequency may be at a frequency with a range of 1 to 400 Hz.

It is thus a feature of at least one embodiment of the invention to provide improved sensing at low frequencies where Doppler phasing is reduced.

The mass spring system may have a quality factor of at least 10.

It is thus a feature of at least one embodiment of the invention to permit significant energy accumulation in the resonant system boosting amplitude.

The mount may provide a base directly attaching to the vibrating object and a swivel allowing repositioning of the reflecting surface at different angles with respect to the base.

It is thus a feature of at least one embodiment of the invention to provide a flexible repositioning of the reflector for improved sensitivity both with respect to the electromagnetic sources and receivers and a major axis of vibration being detected.

The mount may be an article of clothing, a strap, or an adhesive bandage adapted to physically couple the reflector to a human vibrating object to measure physiological vibration.

It is thus a feature of at least one embodiment of the invention to provide a low-cost sender for biological applications such as heartbeat or respiration rate monitoring.

These particular objects and advantages may apply to only some embodiments falling within the claims and thus do not define the scope of the invention.

DETAILED DESCRIPTION OF THE PREFERRED EMBODIMENT

Figure 1:
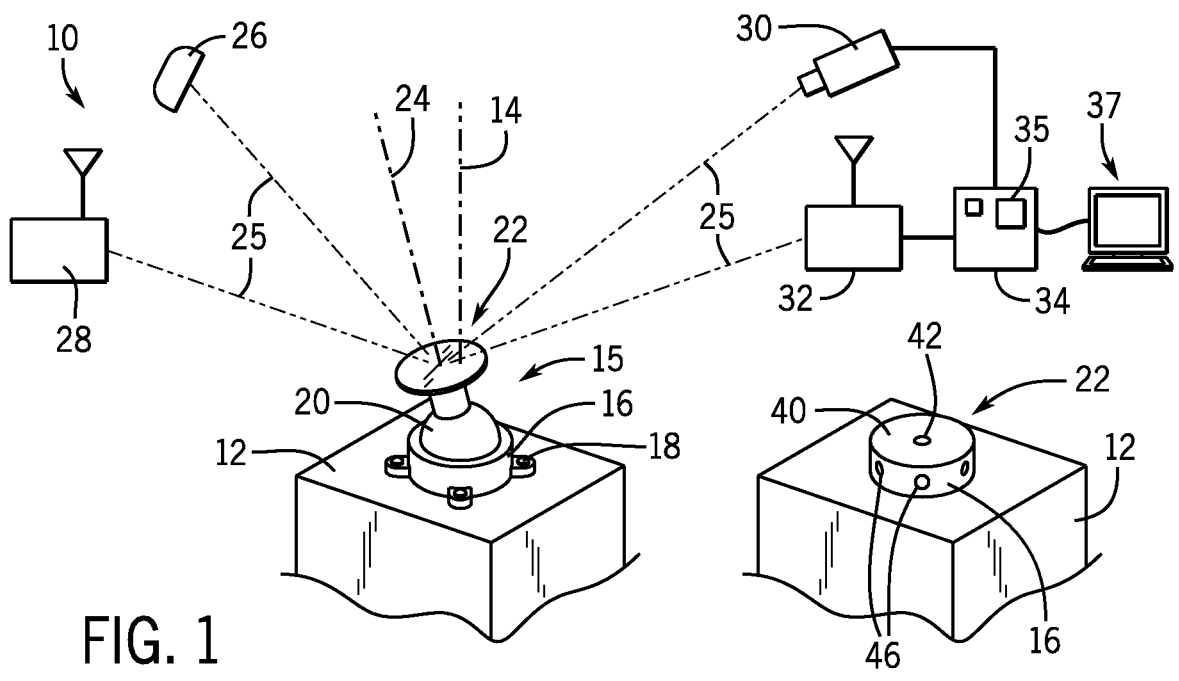
FIG. 1 is a simplified diagram of the sender of the present invention having a pivoting reflector for use with optical or radio wave interrogation, as mounted on a vibrating surface to be measured and showing, in inset, an alternative sender configuration for reduced cost without a pivoting feature.

Referring now to FIG. 1, a sensing system 10 may measure vibrations of a vibrating object 12 such as a machine, vehicle, geological formation, public infrastructure, or the human body. In some cases the vibrating object 12 will have a primary axis 14 depicted in FIG. 1 as vertically oriented and being in a direction of greatest vibrational amplitude.

In the case of an inanimate vibrating object 12, a vibration sender 15 is mechanically affixed to the vibrating object 12, for example, through a base 16 attached to the vibrating object 12 by an adhesive 17 (shown in FIG. 2) or machine fasteners 18, or the like. The base 16 is designed to couple vibrations of a frequency band of interest to other parts of the vibration sender 15 including a reflector 22.

For the purpose of remote sensing, the reflector 22 may be illuminated by electromagnetic radiation 25, for example, from an optical source 26 such as, but not limited to, conventional room lighting or optical sources concentrating energy within infrared or ultraviolet ranges.

Alternatively, the reflector 22 may receive radio waves from a radio transmitter 28, for example, a Wi-Fi transmitter operating at a frequency band of 500 MHz or higher. The radio transmitter 28 need not be dedicated for the purpose of sensing but may be part of a communication network used for other purposes and providing a carrier signal that may be used for remote sensing.

Electromagnetic energy from the optical source 26 and/or the radio transmitter 28 reflects off of reflector 22 as the reflector 22 vibrates to be scattered, deflected, blocked, or refracted in whole or in part as a function of the vibration of the reflector 22 on a path from the optical source 26 and/or the radio transmitter 28 to an optical sensor 30 and/or a radio receiver 32.

In one embodiment, the optical sensor 30 may be a video camera capable of producing image information for monitoring displacements of the reflector 22 or a light intensity detector detecting fluctuations in the intensity of the received light. The radio receiver 32 may provide standard radio reception circuitry that can monitor an amplitude or phase shift of a received carrier frequency from the radio transmitter 28, for example, through AM or phase shift demodulation.

Figure 2:
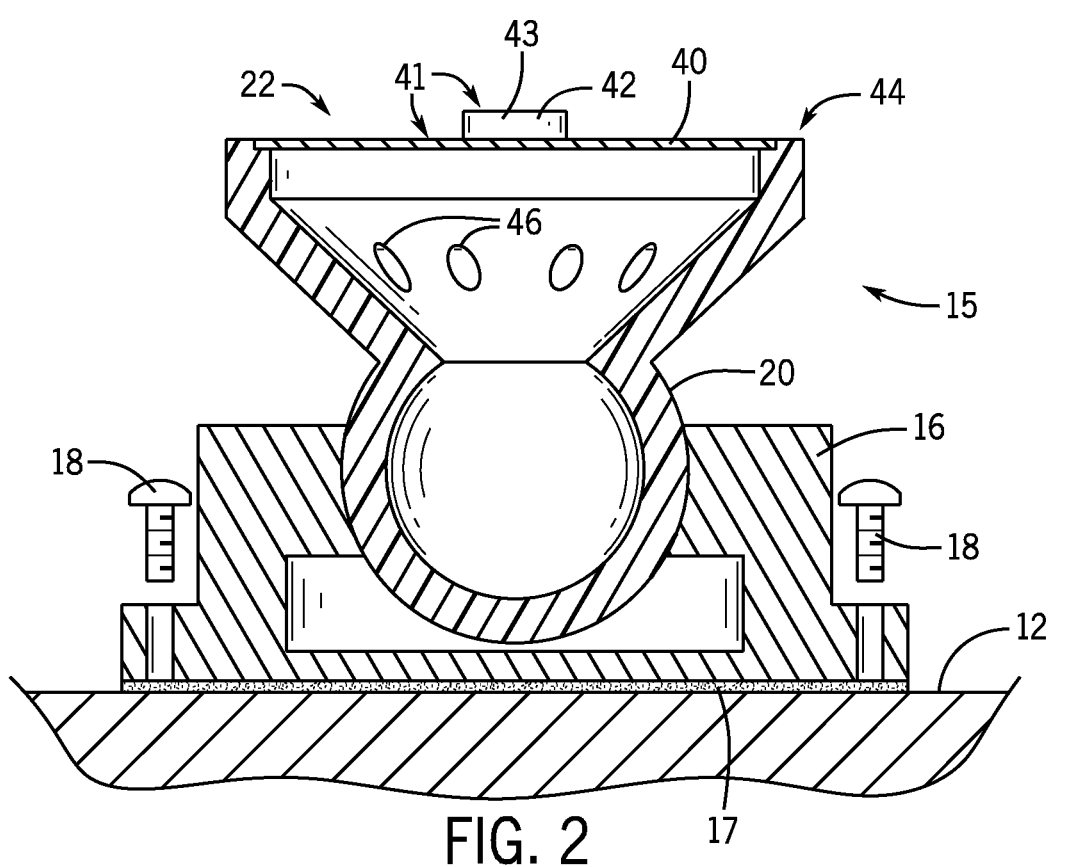
FIG. 2 is a cross-sectional, elevational view through the pivoting sender of FIG. 1 showing a membrane reflector with a discrete weight.

Referring now to FIGS. 1 and 2, the base 16 may provide a swivel 20 which, in one example, may be in the form of a ball and socket allowing ready adjustment of an angular positioning of a reflector 22 attached to swivel 20 with respect to the remainder of the base 16. This angular adjustment, for example, may allow a surface normal 24 of the reflector 22 to be moved to among different angles with respect to the primary axis 14 of the vibration or surface to which the base 16 is attached. In practice, this angle may be adjusted to increase the vibrational coupling of the reflector 22 by increasing its alignment with primary axis 14, or to improve the modification of the electromagnetic signal by changing the angles of incidence and reflectance of the electromagnetic signal. The maximum sensitivity when the optical sensor 30 is a camera may be obtained when the swivel 20 is arranged such that the viewing angle of the video camera is parallel to the vibrating surface; however, other angles may be preferred for radio or a single photodetector detection.

The present invention is intended for remote sensing and accordingly, in some examples, the optical sensor 30 may be separated from sender 15 by one meter or more and the optical source 26 separated from the sender 15 by one meter or more. Similarly, in some examples, the radio transmitter 28 may be separated from the sender 15 by one meter or more and the radio receiver 32 separated from the sender 15 by one meter or more, also for remote sensing.

A single radio receiver/radio transmitter 28 pair can monitor multiple senders 15 distinguishing them through an identifying secondary eigenfrequency as will be disclose below. A single optical sensor 30/optical source 26 may monitor multiple senders 15, distinguishing them by spatial location.

The optical sensor 30 and/or the radio receiver 32 may provide outputs to a computer 34, for example, providing one or more processors communicating with electronic memory holding a stored program 35 whose operation will be described below. The computer 34 may attach to a user terminal 37, for example, providing output plots or data as will be discussed below. The computer 34 executing the stored program 35 operates to extract motion information from a camera image or fluctuating grayscale value available as changes in intensity of received light (for the optical sensor 30) or carrier signal strength or phase (for the radio receiver 32) to produce a quantitative or qualitative measurement of vibration of the vibrating object 12. When optical sensing is used, motion detection of the imaged surface of the reflector 22 may be employed or grayscale value analysis at the vibration boundary in the acquired image, the latter allowing smaller vibration movement to be detected. As will be discussed further below, the operation of the sender 15 is such as to provide improved vibrational sensitivity over a direct sensing of the vibrating object 12 itself without the sender 15.

Referring now to FIG. 1 and FIG. 2, improved vibration sensing using the vibration sender 15 is provided by a mechanical mass and spring system incorporating the reflector 22 of the sender 15. In one case, this mass and spring system provides an elastic membrane 40 offering a generally planar surface when un-deflected and a restoring biasing force when deflected. The clastic membrane 40 thus provides a spring of a mass spring system whose elastic constant k is determined by membrane size, thickness, material, and tension or strain.

The elastic membrane 40 provides a distributed mass which is preferably augmented by a discrete weight 42 and may be placed on the membrane at a vibrational node. The membrane 40 and the discrete weight 42 thus provide a mechanical system having a mechanical resonance at a defined eigenfrequency that can be set to a frequency of interest of the vibrating object 12. Generally, increasing the weight of the discrete weight 42 or area of the membrane 40 or decreasing its stiffness will lower the eigenfrequency, while decreasing the weight of the discrete weight 42 or the area of the membrane or increasing its stiffness will increase the eigenfrequency.

In one embodiment, the elastic membrane 40 may be a thin rubber film. Typically, but not necessarily, the membrane 40 will have a circular area and will be attached to a corresponding circular rim 44. The rim 44 is constructed of a material having substantially different dynamic properties than the membrane 40 so as to create a vibrational stop defining the boundary conditions of the membrane 40. In the case of a circular membrane 40, the resulting system will vibrate according to the Bessel function and the modes of a drum head. When a single discrete weight 42 is used, it may be placed at the center of the membrane 40 at a nodal point of the lowest mode of the effective drum mode.

In one embodiment, the space under the membrane 40 may be vented through vent holes 46. In an alternative embodiment, however, air trapped beneath the membrane 40 may be used to boost the effective spring constant of the membrane 40 for higher eigenfrequencies. Generally, the vibration of the mass spring system formed in this matter will have a relatively high quality factor (Q factor) of greater than two, and typically greater than ten, and in some cases greater than twenty.

In one embodiment, the reflector 22 may be provided by a thin reflective sheet separate from but attached to the membrane 40. Alternatively the membrane 40 itself may be the reflector augmented by optional direct metallization of the membrane 40 through sputtering or the like. For optical reflectance, a localized retroreflective target material 41, such as glass beads or fluorescent materials 43 sensitive to the particular frequency of electromagnetic radiation 25, may be attached to a nodal point (typically the discrete weight 42) for maximum amplitude motion. These treatments operate the signal-to-noise ratio of the optical detection by allowing for a rejection of room lighting with filters or the like.

Figure 3:
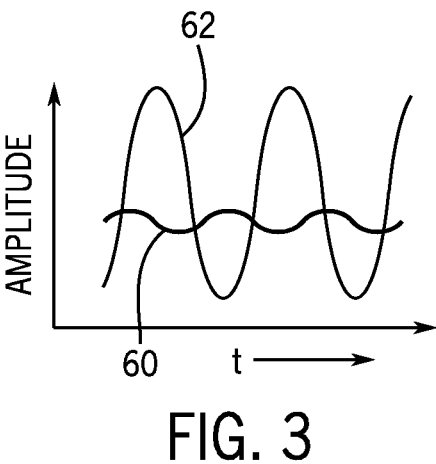
FIG. 3 is a plot of vibration versus amplitude of the vibrating surface compared to the vibration amplitude of the membrane reflector showing a boost in amplitude at the eigenfrequency of the membrane.
Figure 4:
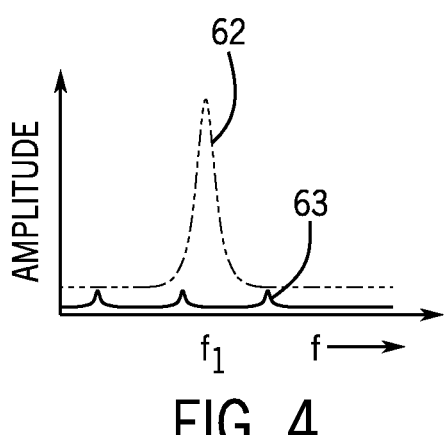
FIG. 4 is a spectrum plot of the vibration of the vibrating surface compared to the vibration of the membrane reflector showing the rejection of signals outside of a frequency of interest defined by the membrane eigenfrequency.

Referring now to FIG. 3, the tuned mass spring system described above allows the amplitude of vibration of the membrane 40 to greatly exceed the amplitude of vibration of the vibrating object 12 according to the quality factor Q of the mass spring system. Referring to FIG. 4, when the vibration of the vibrating object 12 includes multiple frequencies, the quality factor of the mass spring system can also band limit the vibration 62 of the membrane 40, suppressing frequencies 63 of the vibrating object 12 outside of a frequency of interest $f_1$ of the eigenfrequency of the membrane 40, simplifying measurement of a frequency of interest.

Figure 5:
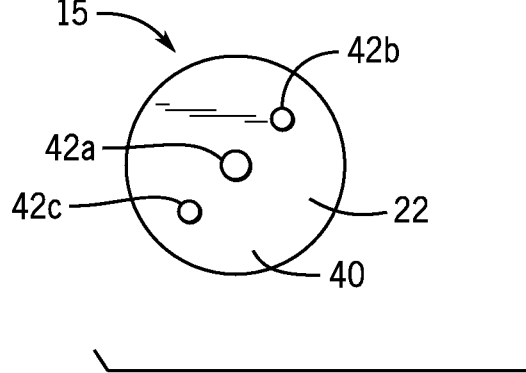
FIG. 5 is a top plan view of an alternative membrane of the device of FIG. 2 providing multiple discrete weights to produce different eigenfrequencies, the top plan view positioned next to a spectrum plot showing the eigenfrequencies produced by the different weights and their interaction with the modes of the membrane.
Figure 5:
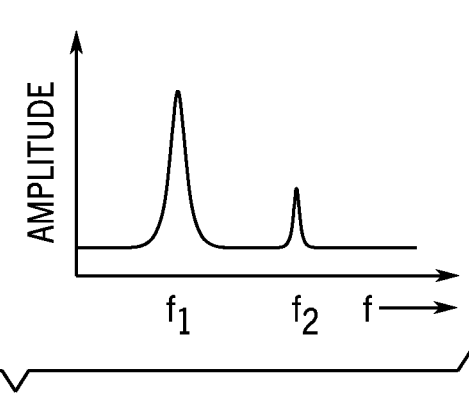

Referring now to FIG. 5, multiple discrete weights 42a-42c may be applied to a single membrane 40 to promote multiple vibration frequency eigenfrequencies, e.g., $f_1$ and $f_2$, of the membrane 40 that are determined by the masses and locations of the discrete weights as well as the membrane properties. The relationship between the masses and the locations and the eigenfrequencies can be determined empirically and are described generally in GAO, C., Halim, D., & Rudd, C. (2018), Study of vibration absorption characteristics of membrane-type resonators with varying membrane configurations, Paper presented at 47th International Congress and Exposition on Noise Control Engineering: Impact of Noise Control Engineering, INTER-NOISE 2018, Chicago, United States.

The result is the control of two eigenfrequency frequencies $f_1$ and $f_2$ which may be independently set. This allows either the analysis of two different vibration frequencies (boosted by the sender 15) or the ability to encode identifying or labeling frequency information in the vibration of the membrane 40. This allows identification of a particular sender 15 in a set of different senders 15 distinguished by, for example, frequency $f_2$ which may vary among senders 15, whereas all senders 15 may optionally have equal eigenfrequencies of $f_1$ providing the vibration information being monitored. In this case, the computer 34 may include a table matching eigenfrequencies to particular different senders 15 so that the additional eigenfrequency effectively provides an identifying label for the sender 15. The ability to monitor and identify frequency $f_2$ presumes a set of rich harmonics in the vibration of the vibrating object 12 sufficient to provide the necessary stimulation at the set frequency as will usually be the case.

Figure 6:
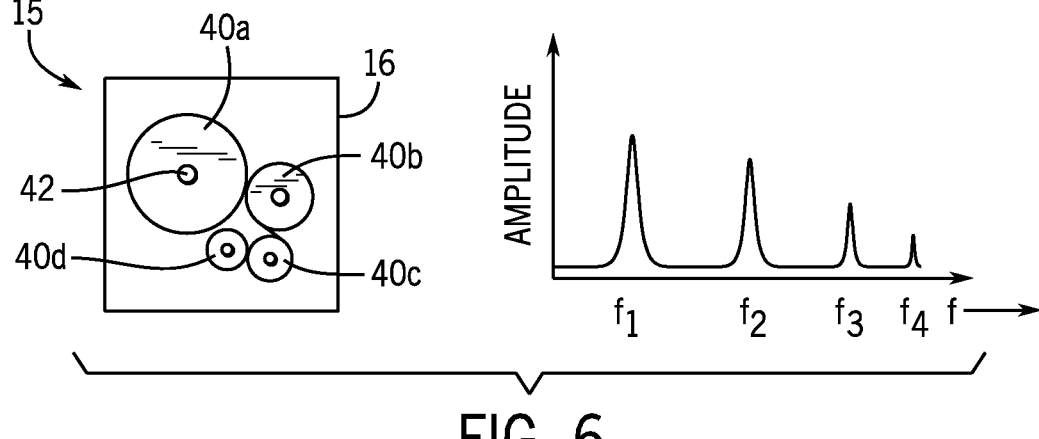
FIG. 6 is a top plan view of a composite sensor employing multiple different membrane sizes to produce discrete frequency measurements, the top plan view positioned next to a spectrum plot showing the eigenfrequencies produced by the different membranes.

Referring now to FIG. 6, in an alternative embodiment multiple different membranes 40a-40d may be assembled together in a single sender 15 to operate in parallel to define multiple eigenfrequencies $f_1$-$f_4$ which can serve the same purpose of either allowing different simultaneous vibration frequencies to be monitored (boosted by the sender 15) or to allow encoding of frequency information distinguishing among senders 15.

Figure 7:
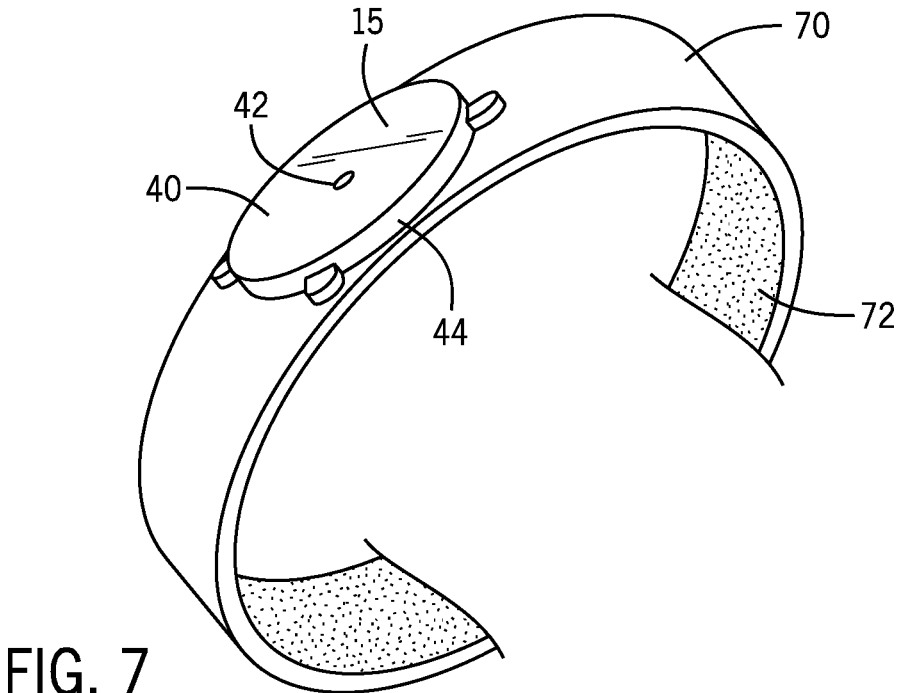
FIG. 7 is a perspective view of a bandage holding a sender of the present invention for therapeutic use in monitoring biological vibration.

Referring now to FIG. 7, in an alternative embodiment for animate vibrating objects 12, a sender 15 of the present invention (for example, employing the second embodiment of FIG. 1 having a cylindrical base) may be attached to a flexible strap 70 to couple the sender 15 to a human for monitoring biological vibration. Example flexible straps 70 include a bandage with an adhesive 72 or a loop with elastic material adjustable with a hook and loop type fastener. Such biological vibration of interest may, for example, include but not be limited to respiration, heartbeat, or the like. In this case, the eigenfrequencies will be set to an extremely low value on the order of 1 Hz.

Figure 8:
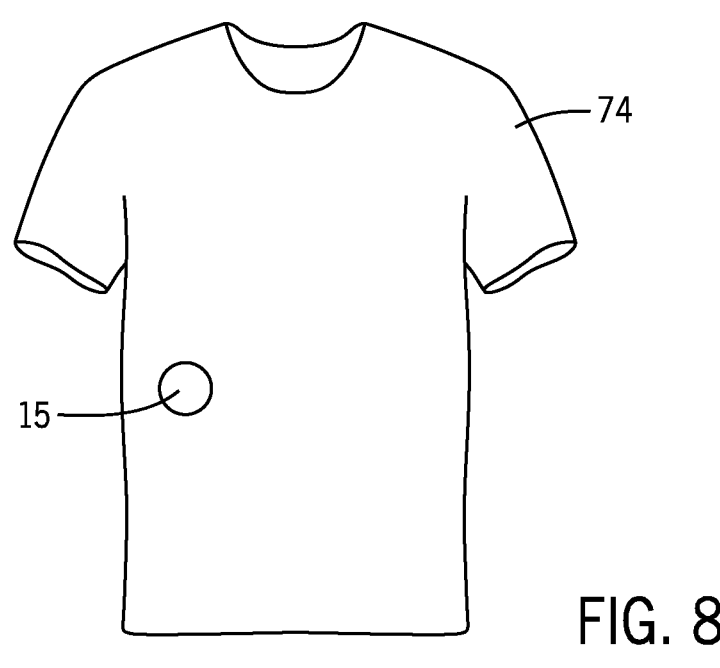
FIG. 8 is an example article of clothing incorporating a sender onto the clothing surface adjacent to the human body.

This ability to monitor biological processes remotely with a low-cost sensor allows a sender 15 to be built into articles of clothing 74, for example, as shown in FIG. 8. In one embodiment clothing may include baby clothing allowing baby monitoring using the techniques described above.

Referring again to FIG. 1, in an alternative embodiment of the vibration sender 15 (shown in inset in FIG. 1), the base 16' may be an upstanding cylindrical tube attached to the vibrating object 12 at a lower rim and whose upper rim supports a membrane 40 and reflector 22. Other than the lack of a pivot discussed above with respect to a first embodiment, this embodiment operates in the same manner as the first embodiment.

While the above description primarily relates to sub acoustic frequencies, it will be appreciated that the design principles of the invention can be applied to monitoring audio frequency and ultrasonic frequency vibration as well. The sender 15 may be battery-free and requires no electrical power source.

In one nonlimiting example of the use of the sender 15 with radio interrogation, the radio transmitter 28 may be a commercially available Asus RT-AC86U Wi-Fi router used as the transmitter and captured by a rooted smartphone (Nexus 6P) with bcm4358 Wi-Fi chip. The Wi-Fi beacon interval is set to 20 ms and distances between the router and measured sample, and the sample and smartphone are both set as 1 m. The measured receiving signal strength is −25 to −30 dB, and the time duration of one vibration measurement is set as 30 s. As Wi-Fi 4 or 802.1 utilizes OFDM (Orthogonal Frequency Division Multiplexing) for transmission, 52 sub-carrier (or channels) CSI across 20 MHz can be computed. The Nexmon CSI tool is used to extract the CSI at the receiver for each antenna. Basic preprocessing such as angle unwrap and time-based correlation between the packets is received on each antenna at the receiver.

CSI phase difference between two antennas at the receiver is then calculated and used to determine the amplitude and frequency of vibration of the surface of interest. As the signal is measured irregularly, plomb, a MATLAB-based implementation of the Lomb-Scargle Periodogram, is applied to obtain the Power Spectral Density (PSD), which is further analyzed to obtain the dominant frequency in a given frequency range. The computations are performed using a sliding window protocol to limit the time frame, over which the plomb is applied to improve its accuracy. The time window is set as 15 s and the window slides forward by 20 ms. The result is averaged over a large number of time windows.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What we claim is:

1. A system for remotely detecting vibration of a vibrating object comprising:

a source of radiated electromagnetic energy;

a reflector adapted to reflect a portion of the radiated electromagnetic energy;

a mount adapt to physically couple the reflector to the vibrating object to promote vibration of the reflector; and a receiver adapted to sense the reflected radiated electromagnetic energy for measurement of the vibration of the reflector;

wherein the reflector provides a coupled mass and elastic biasing producing a predetermined reflector eigenfrequency thereby boosting the predetermined vibration frequency of the vibrating object for detection by the receiver.

2. The system of claim 1 wherein the source of radiated electromagnetic energy is selected from the group of optical emitters and radiofrequency transmitters and the receiver is selected from the group consisting of optical sensors and radiofrequency receivers and the reflector is selected from the group consisting of an optical reflector and a radiofrequency reflector having a dimension of at least one tenth a wavelength of the electromagnetic energy.

3. The system of claim 2 wherein the electromagnetic energy has a primary frequency of energy at a frequency greater than 500 MHz.

4. The system of claim 1 wherein the reflector employs an elastic membrane held within a frame providing a vibrational boundary at the eigenfrequency.

5. The system of claim 4 wherein the reflector elastic membrane includes at least one attached weight whose mass lowers the eigenfrequency.

6. The system of claim 4 wherein the elastic membrane includes at least two attached weights associated with at least two distinct eigenfrequencies.

7. The system of claim 6 wherein the receiver provides an identification table identifying the reflector among multiple reflectors according to one of the at least two distinct eigenfrequencies, and the elastic membrane includes at least two attached weights associated with two distinct eigenfrequencies.

8. The system of claim 6 wherein the at least two attached weights are on vibrationally coupled portions of the elastic membrane within the frame.

9. The system of claim 4 wherein the membrane is a metallized polymer.

10. The system of claim 1 wherein the eigenfrequency is at a frequency with a range of 1 to 400 Hz.

11. The system of claim 1 wherein the coupled mass and elastic biasing have a quality factor of at least 10.

12. The system of claim 1 wherein the mount provides a base directly attaching to the vibrating object and a swivel allowing repositioning of the reflector at different angles with respect to the base.

13. The system of claim 1 wherein the frequency range is between one and 10 Hz and wherein the mount is selected from the group consisting of an article of clothing, a strap, and an adhesive bandage adapted to physically couple the reflector to a human vibrating object to measure physiological vibration.

14. The system of claim 1 wherein the reflector provides a material excited into fluorescence by the radiated electro-magnetic energy and wherein the receiver is preferentially sensitive to a frequency of the fluorescence over the radiated electromagnetic energy.

15. A passive vibration sender for use with a system for remotely detecting vibration of a vibrating object having a source of radiated electromagnetic energy and a receiver adapted to sense reflected radiated electromagnetic energy, the sender comprising:

an elastic membrane providing a reflector providing the reflected radiated electromagnetic energy, the reflector providing a coupled mass and elastic biasing producing a predetermined reflector eigenfrequency between one and 400 Hz thereby boosting predetermined vibration frequency of the vibrating object for detection by the receiver; and a mount adapt to physically couple the reflector to the vibrating object to promote vibration of the reflector;

wherein the reflector is an elastic membrane having at least one attached mass defining the eigenfrequency and held by a frame providing a vibrational boundary at the eigenfrequency and wherein the reflector has a reflective area at least one tenth a size of the a wavelength of the electromagnetic energy squared.

16. The system of claim 15 wherein the mount provides a base adapted to attach directly to the vibrating object and a swivel allowing repositioning of the reflecting surface at different angles with respect to the base.

17. A system for remotely detecting vibration of a vibrating object comprising:

a source of radiated electromagnetic energy;

a reflector adapted to reflect a portion of the radiated electromagnetic energy;

a mount adapted to physically couple the reflector to the vibrating object to promote vibration of the reflector; and a receiver adapted to sense the reflected radiated electromagnetic energy for measurement of the vibration of the reflector;

wherein the reflector provides a coupled mass and elastic biasing producing a predetermined reflector eigenfrequency thereby boosting the predetermined vibration frequency of the vibrating object for detection by the receiver.

* * * * *